(12) United States Patent
Radley et al.

(10) Patent No.: US 11,927,704 B2
(45) Date of Patent: Mar. 12, 2024

(54) HYBRID RADIATION DETECTOR

(71) Applicant: KROMEK LIMITED, Sedgefield (GB)

(72) Inventors: Ian Radley, Sedgefield (GB); Benjamin John Cantwell, Sedgefield (GB)

(73) Assignee: KROMEK LIMITED, Sedgefield (GB)

( * ) Notice: Subject to any disclaimer, the term of this patent is extended or adjusted under 35 U.S.C. 154(b) by 170 days.

(21) Appl. No.: 17/432,577

(22) PCT Filed: Feb. 21, 2020

(86) PCT No.: PCT/GB2020/050408
§ 371 (c)(1),
(2) Date: Aug. 20, 2021

(87) PCT Pub. No.: WO2020/169981
PCT Pub. Date: Aug. 27, 2020

(65) Prior Publication Data
US 2022/0128713 A1     Apr. 28, 2022

(30) Foreign Application Priority Data
Feb. 21, 2019 (GB) .................................. 1902348

(51) Int. Cl.
*G01T 1/16* (2006.01)
*G01T 1/20* (2006.01)
*G01T 1/36* (2006.01)

(52) U.S. Cl.
CPC .......... *G01T 1/1603* (2013.01); *G01T 1/2018* (2013.01); *G01T 1/362* (2013.01)

(58) Field of Classification Search
CPC ..... G01T 1/1603; G01T 1/2018; G01T 1/362; G01T 1/2978; G01T 1/366
See application file for complete search history.

(56) References Cited

U.S. PATENT DOCUMENTS

| 4,963,746 A | 10/1990 | Morgan et al. |
| 2007/0205367 A1* | 9/2007 | Deman ................. G01T 1/2985 250/366 |

(Continued)

FOREIGN PATENT DOCUMENTS

JP     2001159682 A    6/2001

OTHER PUBLICATIONS

ISA/EP, European Patent Office, International Search Report and Written Opinion, dated May 18, 2020, 2 pages, European Patent Office.

*Primary Examiner* — David P Porta
*Assistant Examiner* — Mamadou Faye
(74) *Attorney, Agent, or Firm* — Ference & Associates LLC (57) ABSTRACT

A hybrid radiation detector is described comprising a first energy discriminating detector element selected to be sensitive to incident radiation of a lower energy range and a second detector element selected to be sensitive to incident radiation of a higher energy rage and a second detector element. In embodiments, a first detector element comprises a semiconductor detector; and a second detector element comprises a scintillator detector. The first detector element may thus be suitable to be more responsive to radiation in a first, lower energy range and/or configured and arranged to collect incident radiation emergent from a target of such energy that the photoelectric effect predominates as an attenuation mode in the target; and the second detector element may thus be suitable to be more responsive to radiation in a second, higher energy range and/or configured and arranged to collect incident radiation of a generally higher energy. A method of detecting radiation using such a hybrid detector is also described.

19 Claims, 3 Drawing Sheets

(56) References Cited

U.S. PATENT DOCUMENTS

| | | | |
|---|---|---|---|
| 2008/0099689 A1* | 5/2008 | Nygard | G01T 1/2018 250/370.09 |
| 2012/0145910 A1* | 6/2012 | Suyama | G01V 5/005 250/366 |
| 2016/0259067 A1* | 9/2016 | Morton | G01T 1/208 |
| 2017/0090039 A1* | 3/2017 | Hoffman | A61B 6/42 |

* cited by examiner

HYBRID RADIATION DETECTOR

The present application is a National Phase Entry of PCT International Application No. PCT/GB2020/050408, which was filed on Feb. 21, 2020, and which claims priority to Application No. 1902348.0 filed in Great Britain on Feb. 21, 2019, the contents of which are hereby incorporated by reference.

INTRODUCTION

X-ray techniques are widely used to identify materials, in areas such as aviation security and food screening. Initial applications were based on X-ray imaging identifying anomalous shapes, more recently the technology has been stretched to identify materials present by investigating the absorption profiles of the materials.

The Beer-Lambert law (BLL) states the for light of energy E, passing through a medium of thickness t with energy dependent linear absorption coefficient $\mu_E$, the emergent intensity $I_E$ is related to the incident intensity $I_{oE}$ by $$I_E = I_{oE} \exp(-\mu_E t)$$

The energy dependent linear attenuation coefficient is a function of the atomic number of the material (Z) and its density, $\rho$, with the attenuation caused by three processes; Compton Scattering the Photoelectric effect and Pair Production. In normal X-ray regimes, the energy is below the 511 MeV threshold for pair production, so the former two processes dominate. At lower energies, the Photoelectric Effect, which is dependent upon Z, dominates, whilst at higher energies the Z-independent Compton Scattering dominates. By measuring attenuation across two or more energy bands, the effective atomic number and density of the attenuating material can be determined, and the material identified.

Different types of detector have been used for materials identification via X-ray attenuation measurements. Dual energy detectors, generally consisting of consecutive scintillator detectors, aim to measure representatives of the low and high energy absorptions to determine the density (using the high energy signal) and effective atomic number (using the high and low energy signals) of the material. Semiconductor detectors, such as cadmium zinc telluride (CZT) detectors, have also been used, where the energy of the photon is converted directly into electrical signal, and the incoming photons can be placed into discrete energy bins. Using this method, the energy dependence of the attenuation coefficient can be determined, and materials properties calculated.

When separating materials of different effective atomic number, the majority of the difference in attenuation can be seen at lower energies (i.e. less than about 60 keV). As the energy increases, and Compton Scattering dominates the photoelectric effect, the any separation is purely down to a difference in density. Therefore, whilst high energy signal is required to determine density, it is preferable to precise measurements covering the lower energy regime.

Figure 2:
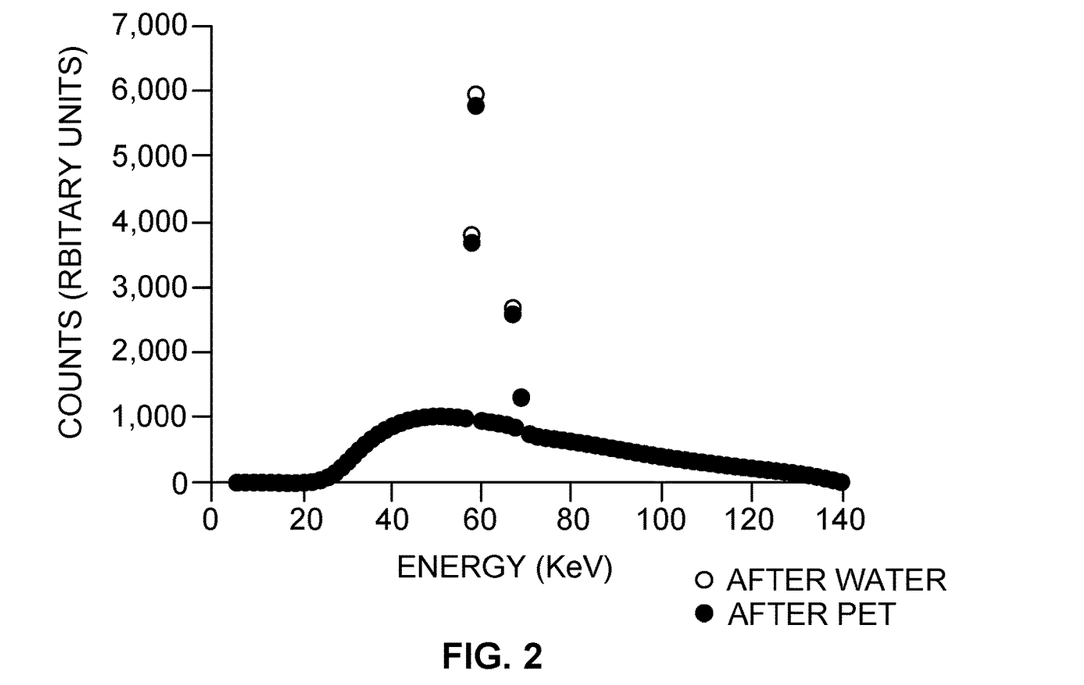
FIG. 2 shows simulated energy spectra after 5 cm of water and subsequently 1 mm PET.

As an example, FIG. 2 shows a simulation in which a 5 cm sample of water is irradiated from a 140 kV X-ray source, with the emergent photons subsequently irradiating a 1 mm thick sample of plastic (PET).

Figure 3:
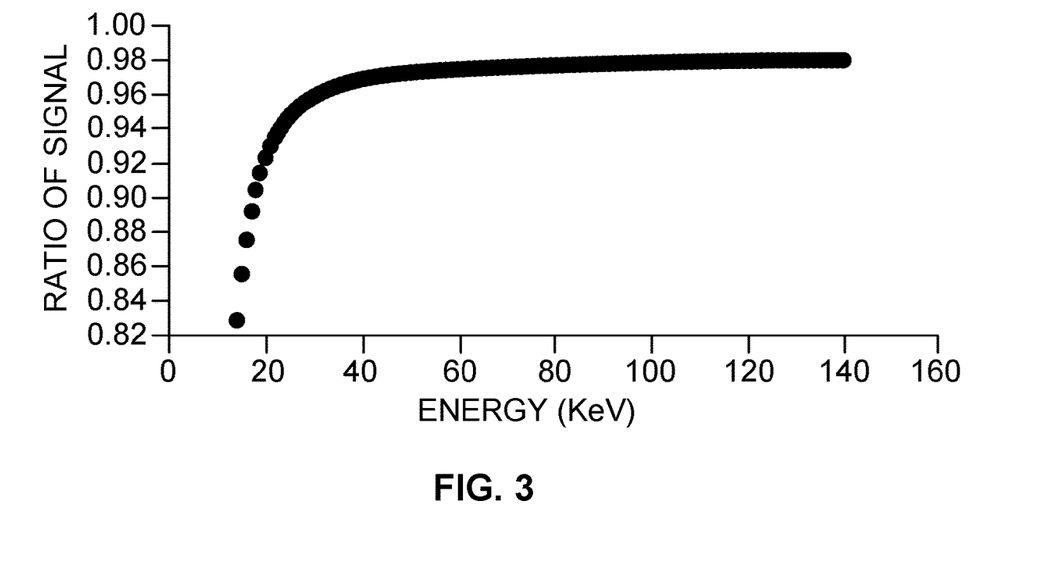
FIG. 3 shows a ratio of signals emerging from water and plastic.

Only a small difference can be seen between the two spectra. If the ratio of the two signals is taken, as shown in FIG. 3, the difference becomes apparent at low energies.

To be able to capture the differences between signals, and to improve materials identification, sampling at multiple energy levels in the lower energy part of the spectrum, where the photoelectric effect dominates, is preferential. Scintillator detectors are not able to sample at multiple energy levels in a portion of the spectrum. Traditional photon counting semiconductor detectors are able to measure at multiple energy bands, and are typically designed to capture a significant proportion of the X-ray spectrum across the energy bands. As shown above, it is not necessary to sample with good energy resolution at higher energies in order to get a good measure of the Compton Scattering, and therefore sample density.

In a semiconductor detector every photon which is absorbed in the detector medium deposits a charge, with electronics used to capture the charge and count each photon. The detector medium will have limitations in the count rates it can handle, due to considerations such as polarisation, and interpixel charge sharing. In addition, the electronics also have limitations on the count rates they can handle, due to considerations such as pulse pile-up and buffer size. A semiconductor detector which measures across a wide energy spectrum, with a limited total count rate, will be limited in that any high energy photons captured can reduce the available counting capacity at lower energies, thus reducing the precision at lower energies.

A radiation detector that is effective both in the region where the photoelectric effect dominates and in the region where Compton Scattering dominates is desirable. A detection system that offers the potential to mitigate the disadvantages and/or exploit the advantages of each such class of detector at particular energies is desirable.

SUMMARY OF INVENTION

In accordance with the invention in a first aspect, a hybrid radiation detector comprises a first detector element and a second detector element. The invention is characterised in that the first detector element is selected to be sensitive to incident radiation of a lower energy range and the second is selected to be sensitive to incident radiation of a higher energy rage, and in that the first detector element is selected to be energy discriminating within that lower energy range.

For example, the first detector element is selected to be suitable for, and in use is directed to the collection of, radiation transmitted through a target material or object in a first, lower energy range being that where photoelectric absorption will tend to be a predominant attenuation mode in the target, and the second detector element is selected to be suitable for, and in use is directed to the collection of, radiation transmitted through a target material in a second energy range higher than the first and for example being that where Compton scattering will tend to be a predominant attenuation mode in the target.

The first detector element, being energy discriminating within the lower energy range where photoelectric absorption will tend to be a predominant attenuation mode in the target, will enable collection of data from radiation interactions in the detector from which inferences can be drawn about the effective Z contribution to attenuation of radiation transmitted through the target, and thus about material composition. The second detector element, being sensitive at the higher energy range where Compton scattering will tend to be a predominant attenuation mode in the target will enable collection of data from radiation interactions in the detector from which inferences can be drawn about the Z-independent but density dependent Compton Scattering effect on radiation transmitted through the target, and thus about the density of the target.

Thus, in some embodiments the hybrid radiation detector comprises:

a first, energy discriminating detector element selected to be more responsive to radiation in a first, lower energy range;

a second detector element selected to be more responsive to radiation in a second, higher energy range An energy discriminating detector element is adapted to produce a response from which can be determined, for each of the plurality of radiation interactions at the detector, a characteristic of the interaction that includes at least an energy of the interaction. In this way, in use in the preferred application, interactions may be discriminate by energy and counts distributed across plural energy bands or bins to create a dataset from which inferences may be drawn about the photoelectric absorption and effective Z contribution to attenuation of radiation transmitted through a target, and thus about material composition.

A semiconductor detector may be particularly suited for and readily adapted to the energy discriminating collection of radiation transmitted through a target material or object at a first, lower energy range where photoelectric absorption will tend to be a predominant attenuation mode in the target and will in particular advantageously enable energy differentiation in this range. The first detector element may therefore preferentially be a semiconductor detector.

The second detector element need not be energy discriminating and may for example be energy integrating.

A scintillator detector may be particularly suited for and readily adapted to the collection of radiation transmitted through a target material or object at a second, higher energy, for example where Compton scattering will tend to be a predominant attenuation mode in the target and will in particular advantageously achieve a high collection efficiency in this range. The second detector element may therefore preferentially be a scintillator detector.

Thus, in some embodiments, the hybrid radiation detector comprises:

a first detector element comprising a semiconductor detector;

a second detector element comprising a scintillator detector.

However, the invention also encompasses hybrid detectors in which the second detector element is not a scintillator detector and is for example another semiconductor detector sensitive to a higher energy range.

A detector in accordance with the invention finds particular application in respect of the determination of a radiation interaction in a target material or object by detecting emergent radiation from a target material or object from radiation incident upon the target material or object. For example, the radiation detector finds application in the determination of attenuation of radiation incident upon the target material or object after transmission therethrough, and for example in determination from that transmitted radiation of the extent of attenuation of incident radiation such as x-ray radiation.

The problem arising in the prior art in such applications has been discussed above, and the solution offered by the invention is discussed below in the same example context.

Figure 1:
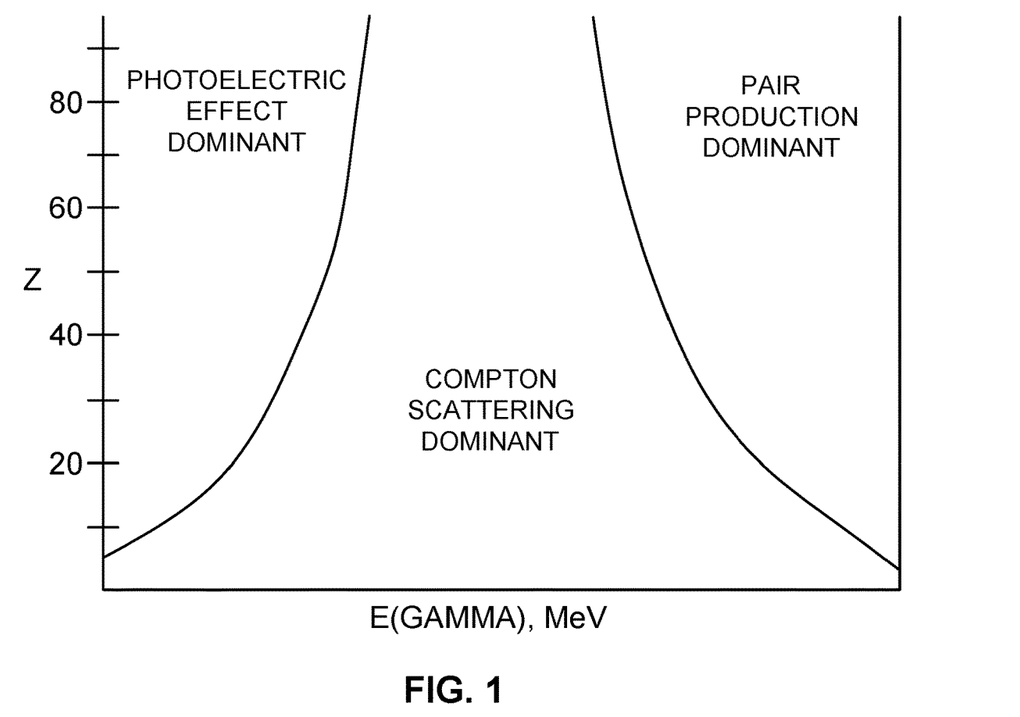
FIG. 1 shows graphically the dominant absorption mechanism at different photon energies and atomic numbers.

In particular, dominant attenuation modes are illustrated in FIG. 1. As has been discussed, in normal x-ray regimes, the energy is below the 511 MeV threshold for pair production, so the dominant processes are the photoelectric effect and Compton Scattering. The photoelectric effect dominates at lower energies, and Compton Scattering becomes more significant at higher energies. As shown in FIG. 1, the precise point at which the one effect takes over from the other varies to some extent with atomic number but is generally below 100 keV and may be particularly marked below about 60 keV. At higher energies than this Compton Scattering comes to predominate.

In accordance with the principles of the invention, the radiation detector is a hybrid detector comprising a first detector element and a second detector element, the first detector element being a semiconductor detector suitable to be more responsive to radiation in a first, lower energy range, and the second detector element being a scintillator detector suitable to be more responsive to radiation at a second energy range higher than the first energy range.

For example the hybrid detector is adapted to detect radiation incident upon and emergent from and for example transmitted through a target material or object, and is specified with respect to a target material or object or typical set of target materials or objects such that the first, lower energy range comprises an energy range where the predominant attenuation mode in the specified target material or object is expected to be photoelectric absorption, and the second, higher energy range comprises an energy range where the predominant attenuation mode in the specified target material or object is expected to be Compton Scattering.

Thus, the first detector element is adapted to be more responsive to radiation in a first, lower energy range where the predominant attenuation mode in the target material or object is expected to be photoelectric absorption, and the second detector element is adapted to be more responsive to radiation in a second, higher energy range where the predominant attenuation mode in the target material or object is expected to be Compton Scattering.

For example, the first detector element, being in some embodiments a semiconductor detector element is adapted and configured with reference to a target material or object such as to capture a substantial proportion and for example at least a major proportion of radiation in the first, lower energy range, while absorbing fewer and for example only a minor proportion radiation in the second, higher energy range The first detector element, being in some embodiments a semiconductor detector element, is therefore adapted and configured in such manner that it is sensitive to receive and be more responsive to radiation emergent from a target material in the range where the predominant attenuation mode for that target material is the photoelectric effect. As has been discussed, the precise energy range will depend upon the target material, but on identification of a target material will be comfortably determinable by the skilled person from general knowledge.

Most particularly, the first, for example semiconductor, detector element is configured to be sensitive and responsive in the desired energy range by selection of an appropriate thickness of detector element. The appropriate thickness will vary dependent both upon the desired energy range and upon the material and detection properties of the semiconductor or other detector material(s), but again the skilled person would readily be able to determine appropriate selections and parameterisations for a given target material.

Typically, the first, for example semiconductor, detector element will have a thickness controlled such that a majority of photons in the desired energy range, being the range where the photoelectric effect predominates as an attenuation mechanism in a specified target material, are detected, but a majority of photons having a higher energy than this range are passed through without detection. Thus, the first, for example semiconductor, detector element is likely to be relatively thin. While the desired thickness will be dependent upon and readily determinable by material selection, a suitable thickness might be in the range 10 µm to 1 mm, and more preferably 100-250 µm.

In some embodiments, discussed by way of example below, the hybrid radiation detector comprises a first detector element comprising a semiconductor detector; and a second detector element comprising a scintillator detector.

Thus, in the preferred case, the hybrid detector comprises a first detector element that is a semiconductor detector configured and arranged to collect incident radiation emergent from a target of such energy that the photoelectric effect predominates as an attenuation mode in the target; and a second detector element that is a scintillator detector configured and arranged to collect incident radiation of a generally higher energy. In this way, the hybrid detector offers the potential to mitigate the disadvantages of each individual class of detector at particular energies and to combine the advantages, with the first detector element being particularly sensitive in the target lower energy range where the photoelectric effect predominates, and the energy dependence of the attenuation coefficient is significantly dependent upon atomic number, while the scintillator detector is used for its greater efficiency at higher energies where the photoelectric effect, which is dependent upon atomic number, no longer predominates and the differentiation of energy becomes less important.

Both semiconductor detectors and scintillation detectors for the detection of ionizing radiation are well known and find broad application for gamma and x-ray spectrometry and as particle detectors.

In a semiconductor detector, the ionizing radiation is measured directly by the detection of charged carriers created within the detector material by interaction with the incident ionizing radiation. Known semiconductor detectors include doped silicone and germanium detectors, and detectors of the cadmium telluride and cadmium zinc telluride class.

In particular, semiconductor detector materials are known which are readily adaptable to differentiate incident radiation between plural energy bands being particularly sensitive in the lower energy range where the photoelectric effect predominates, and the energy dependence of the attenuation coefficient is significantly dependent upon atomic number, and thus allow inferences to be drawn about effective atomic number of the target.

Preferably, the semiconductor detector comprises a material adapted to exhibit a spectroscopically variable response across the target energy range. In particular, a semiconductor material may be used that exhibits inherently as a direct material property a direct variable electrical and for example photoelectric response to different parts of the radiation spectrum in use.

In some embodiments the semiconductor material is formed as a single crystal.

In some embodiments the semiconductor material may be selected from Group II-VI semiconductors and in particular may be selected from cadmium telluride, cadmium zinc telluride (CZT), cadmium manganese telluride (CMT), and alloys thereof, and for example, save for incidental impurities, consists essentially of crystalline $Cd_{1-(a+b)}Mn_aZn_bTe$ where $a+b<1$ and $a$ and/or $b$ may be zero. The detector element may also have other components of other materials for additional functionality.

Scintillator detectors are similarly known. The scintillator detector element may comprise any suitable scintillator detector comprising a scintillator and a suitable photodetector.

Various scintillator materials are well known. Known scintillator materials include organic scintillators and inorganic scintillators. Certain inorganic scintillators may be particularly suited to use in compact detectors, and for example portable detectors. Known classes of inorganic scintillator include doped alkali halides, such as NaI(Tl), CsI(Tl), CsI(Na), LiI(Eu); other slow inorganics such as BGO, $CdWO_4$, ZnS(Ag); $Ce^{3+}$-activated fast inorganics such as lanthanum chloride ($LaCl_3(Ce)$), lanthanum bromide ($LaBr_3(Ce)$), CLLB ($Cs_2LiLaBr_6(Ce)$), GSO ($Gd_2SiO_5$(Ce)), YAP, YAG, LSO, LuAP, and the like. Many of this last class in particular are highly hygroscopic.

Suitable photodetectors, particularly for compact and for example portable operation, include photomultipliers. Suitable photomultipliers include photomultiplier tubes (PMT) and photodiodes. Solid state photomultipliers, including silicon photomultipliers (SiPMs) are particularly suited to application in compact and for example portable detectors.

In accordance with the principles of the invention in relation to its preferred application, the first detector element and the second detector element are respectively configured and arranged to be particularly sensitive to and adapted to detect radiation in a respective first energy range and second energy range. In the preferred use, the first energy range corresponds to an energy range of radiation emergent from and for example transmitted through a target material in which range the photoelectric effect predominates as an attenuation mechanism in the target material, and the second energy range corresponds to an energy range of radiation emergent from and for example transmitted through a target material in which range Compton Scattering predominates as the attenuation mode.

In a preferred case, the first detector element is so adapted by selection of an appropriate thickness and material combination as above described.

In a preferred case, the second detector element may be so adapted in one or both of two ways.

First, the second detector element, and for example either or both of the scintillator material and the photodetector, may be specifically adapted to be more responsive in the second energy range and for example responsive with a particular preferential selectivity and/or efficiency and/or to be correspondingly less responsive in the first energy range.

Second, a filter element may be provided disposed on an incident side of the second detector element to filter out a proportion and for example a major proportion in the first energy range before it is incident upon the second detector element.

A bespoke filter element may be provided. Additionally or alternatively, the first detector element may be disposed over the second detector element (that is, on a side of the detector intended to be proximal to the radiation incident upon it in use) so as to act in use itself to filter out a proportion of the radiation in the first energy range before it is incident upon the second detector element.

In a possible configuration of the two detector elements, the first detector element may be positioned over the second detector element (that is, on a side of the detector intended to be proximal to the radiation incident upon it in use). Optional additional elements, including for example a filter element as above described, may be positioned between the first detector element and the second detector element.

In an alternative possible configuration, the first and the second detector elements may be disposed side by side. An optional filter element as above described may be disposed on the second detector element.

In a preferred application, the detector is a detector for the detection of high energy photons, and in particular for the detection of x-rays and/or gamma rays.

In a particular preferred application, the detector is a detector for the determination of the attenuation of x-rays and/or gamma rays as they pass through a target object or material, in particular for the determination of the material composition of the said target object or material.

In a preferred embodiment, the detector further comprises a data processing module adapted to integrate data received from each detector element corresponding to each of a plurality of detected radiation interactions therein, and optionally further adapted to process the received data and draw inferences about the source of radiation incident upon the two detector elements.

In particular, in the preferred application in determination of the attenuation of radiation passing through a target material or object, the processing module is adapted to draw inferences about the material or composition of the object from the variation of attenuation by the material or object with energy as determined by the first and second detector elements.

For example, the processing module is adapted to perform any or all of the following: receive a plurality of responses to a corresponding plurality of interactions attributable to incident radiation occurring within each of the first and second detector elements;
  determine, for each of the plurality of responses, a characteristic of the interaction including at least a count of the interaction;
  collectively process the resultant plurality of counts of interaction so determined;
  draw inferences from the said plurality of counts of interaction about the source of radiation incident upon the detector elements, and in particular where applicable about the material composition of a material or object causing attenuation of radiation from a source as it passes through the material or object before being incident upon the detector elements.

Each radiation interaction detected at the detector is associated with an incident photon or particle incident upon the detector, for example having passed through a target material or object. Thus, the interactions occurring at the detector can be used to draw inferences about attenuation of radiation from a source as it takes place within the target material or object, and in particular, because of the use of a first detector element and a second detector element respectively sensitive to different attenuation modes, to draw inferences about the material composition of the material or object.

At least a count of each interaction is determined. Optionally additionally further characteristic(s) of each interaction may be determined. Advantageously, this may be done for at least the first detector element to utilise its ability to discriminate by energy. Advantageously therefore at least for the first detector element, the determination, for each of the plurality of responses, of a characteristic of the interaction includes additionally at least an energy of the interaction. In this way, interaction counts may be distributed across plural energy bands or bins.

In accordance with the invention in a second aspect, a method of detecting radiation comprises:
  providing a hybrid detector as above described;
  causing radiation to be incident upon the hybrid detector;
  obtaining a plurality of responses from each detector element to a corresponding plurality of interactions occurring within each detector element from the radiation incident thereon;
  determining for each of the plurality of responses a characteristic of the interaction including at least a count of the interaction;
  drawing inferences therefrom about the source radiation.

The method is thus conveniently a method of use of the detector of the first aspect of the invention, and preferred features of the method will be understood by analogy.

In particular, in some embodiments, a method of detecting radiation comprises: providing a hybrid detector comprising:
  a first detector element selected to be more responsive to radiation in a first, lower energy range;
  a second detector element selected to be more responsive to radiation in a second, higher energy range;
  causing radiation to be incident upon the hybrid detector;
  obtaining a plurality of responses from each detector element to a corresponding plurality of interactions occurring within each detector element from the radiation incident thereon;
  determining for each of the plurality of responses a characteristic of the interaction including at least a count of the interaction;
  drawing inferences therefrom about the source radiation.

In particular, in some embodiments, a method of detecting radiation comprises:
  providing a hybrid detector comprising:
  a first detector element comprising a semiconductor detector;
  a second detector element comprising a scintillator detector;
  causing radiation to be incident upon the hybrid detector;
  obtaining a plurality of responses from each detector element to a corresponding plurality of interactions occurring within each detector element from the radiation incident thereon;
  determining for each of the plurality of responses a characteristic of the interaction including at least a count of the interaction;
  drawing inferences therefrom about the source radiation.

In particular, the method is preferably applied to the determination of a radiation interaction in a target material or object by the detection of emergent radiation from the target material or object from radiation incident upon the target material or object. In particular, the method is a method of determination of attenuation of radiation incident upon the target material or object as it is transmitted through the target material or object. In particular, the method is a method for the detection of attenuation of photons such as x-ray or gamma ray photons incident upon the target material or object from a suitable source.

Thus, in accordance with a more complete embodiment of the method, the method comprises providing a source of radiation such as x-ray or gamma ray radiation; causing the radiation to impinge upon a target;
  positioning a detector comprising a first detector element comprising a semi-conductor detector and a second detector element comprising a scintillator detector to receive radiation consequently emergent from the target;
  performing the method as above described in relation to emergent radiation consequently incident upon the detector.

That is, the performing the method as above described comprises:

causing radiation emergent from the target to be incident upon both detector elements;

obtaining a plurality of responses from each detector element to a corresponding plurality of interactions occurring within each of the first and second detector elements from the radiation incident thereon;

determining for each of the plurality of responses a characteristic of the interaction including at least a count of the interaction;

drawing inferences therefrom about radiation emergent from the target.

For example, the method comprises:

collectively processing the resultant plurality of energies of interaction so determined;

drawing inferences from the said plurality of energies of interaction about the material composition of the target causing attenuation of radiation from a source as it passes through the target before being incident upon the detector elements.

In particular preferably, the method comprises drawing inferences about the effective atomic number and density of the target from the determined energies of the plurality of interactions detected at the first and second detector elements.

DETAILED DESCRIPTION

FIG. 1, which has been discussed above, shows the dominant attenuation mechanism within a target material at different photon energies and atomic numbers.

FIGS. 2 and 3, also discussed above, illustrate the effect which the invention seeks to exploit in order to identify and differentiate materials of different effective atomic number. As is illustrated in those figures, the majority of the difference in attenuation between materials (such as, in the example, water and PET) can be seen at lower energies, for example less than about 60 keV. At these lower energies the photoelectric effect predominates and differences indicative of effective atomic number can be observed but as the energy increases Compton Scattering predominates, and any separation becomes attributable instead primarily to differences in density. Therefore, the higher energy signal is required to determine density of a target material, while the lower energy signal is the more sensitive to effective atomic number of a target material.

Figure 4:
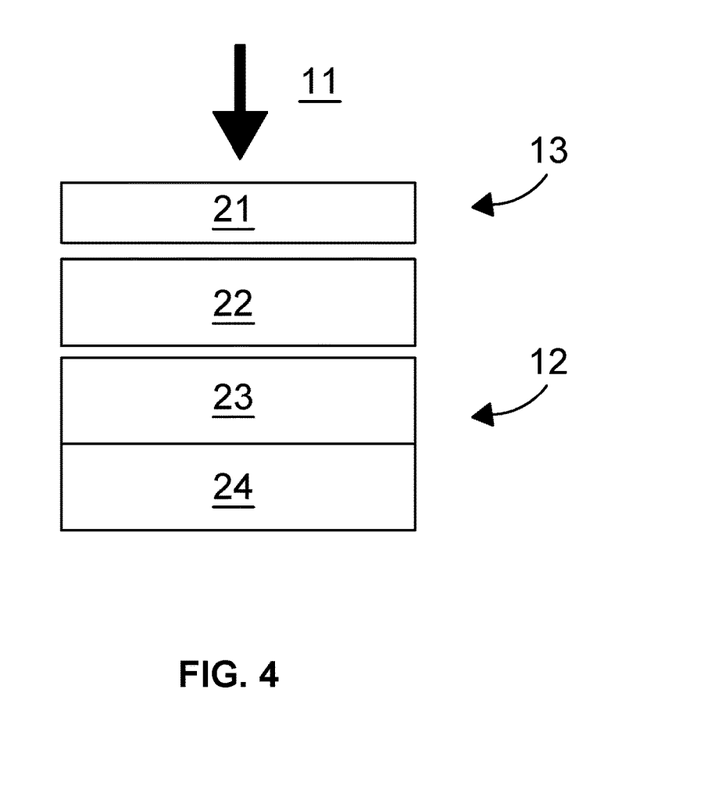
FIG. 4 is a simple schematic in cross section of a first embodiment of a hybrid detector in accordance with the principles of the invention.
Figure 5:
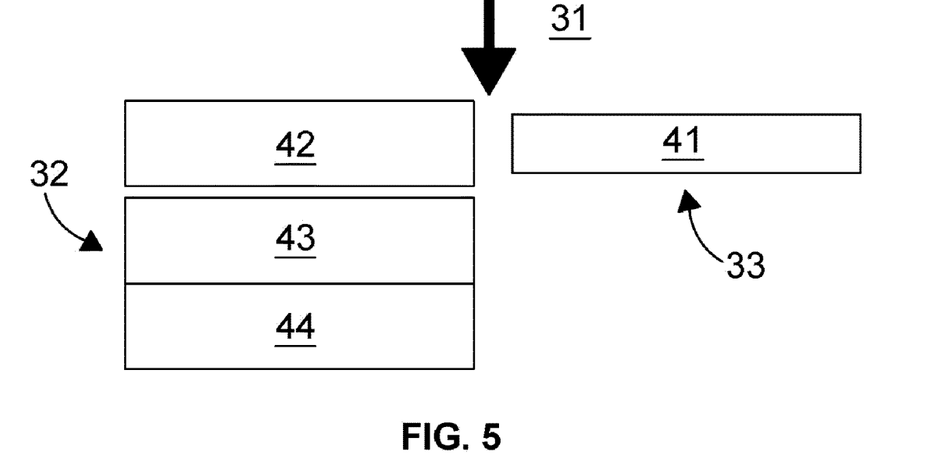
FIG. 5 is a simple schematic in cross section of a second embodiment of a hybrid detector in accordance with the principles of the invention.

FIGS. 4 and 5 illustrate embodiments of a hybrid detector in accordance with the principles of the invention, which seek to optimise the ability to detect photons whose attenuation is attributable to both effects, and thus more effectively to differentiate materials both by density and by effective atomic number simultaneously in integrated manner. In each embodiment the first component of the hybrid detector comprises a thin semiconductor detector with the second component comprising a scintillator detector, with an optional absorber being disposed on an incident radiation side of the scintillator.

In each illustrated embodiment, and in all implementations of the invention, the semiconductor detector thickness is chosen to capture a sufficient amount of low energy photons, while absorbing relatively few high energy photons. In this context "low energy" and "high energy" are determined with respect to a specified target material or object, "low energy" photons being those within a lower energy range where the predominant attenuation mode in the specified target material or object is expected to be photoelectric absorption, and "high energy" photons being those within a higher energy range where the predominant attenuation mode in the specified target material or object is expected to be Compton Scattering.

Preferably, a lower energy range and a higher energy range are defined with reference to a specified target material or object as above. Preferably, the thickness of the semiconductor detector element (measured in a z-direction corresponding generally to an incident radiation direction in use) is selected with reference to a target material or object such as to capture a substantial proportion and for example at least a major proportion of lower energy photons, while absorbing fewer and for example only a minor proportion of higher energy photons.

This determination of thickness will be semiconductor material dependent and will also depend on the spectrum of the radiation incident upon the target material, and the consequent spectrum of the radiation after transmission through the target material which the detector is intended to detect. In particular, this determination will consequently depend upon the specified target material or object as the appropriate parameters for the "lower energy" and "higher energy" ranges, respectively where photoelectric absorption and Compton Scattering predominate, will vary with the target. These parameters vary in a predictable and known manner, so the determination is trivially within the competence of the skilled person.

For example, for a CZT detector this is likely to less than 1 mm.

By contrast the scintillator material and thickness will be chosen to have a high detection efficiency/high capture for higher energy photons.

Both of these design choices will be comfortably within the competence of the skilled person.

Referring specifically to FIG. 4, incoming radiation (11), which in the preferred application of the invention may be x-ray radiation which has first passed through a target material or object and been subject to attenuation for example attributable to the photoelectric effect and Compton Scattering, is incident upon a hybrid detector comprising a first, semiconductor detector element (13), and a second, scintillator detector element (12). The first element (13) is disposed above the second element (12) so that incident radiation (11) impinges first upon the first element (13) and then having passed therethrough impinges on the second element (12).

In the illustrated embodiment, the first, semiconductor detector element (13) comprises a relatively thin layer (measured in the incident radiation direction 11) of 0.25 mm thick cadmium zinc telluride (21), and the second, scintillator detector element (12) comprises a 10 mm thick NaI scintillator layer (23) with a suitable photodetector (24), in the example embodiment comprising a solid state photodetector such as a SiPM.

It can be observed that the CZT detector will as a result of its positioning and selected thickness be configured to collect a major proportion of the lower energy photons, but that most higher energy photons will pass through. Thus, in the preferred application of the invention where the detector is positioned to detect radiation transmitted by a target material or object and thus draw inferences from the attenuation of that radiation about the target material or object, the CZT detector will collect transmitted photons in the energy range where the dominant attenuation mode in the target material or object is photoelectric absorption, but transmitted photons in the energy range where the dominant attenuation mode in the target material or object is attributable to Compton Scattering will pass through the CZT detector element.

This detector element will thus effectively capture transmitted lower energy photons, and thus effectively detect the photoelectric contribution to attenuation in the target material or object, but with a much smaller contribution being attributable to the higher energy photons. This maximises the exploitation of the ability of the semiconductor detector to differentiate the spectrum across different energy bands, and thus to derive effective atomic number information from the lower energy photons, but keeps the count rate low by reducing the total number of high energy photons captured which would otherwise reduce the available counting capacity for the lower energy photons, and thus maintains the precision of differentiation of the lower energy photons.

The scintillator detector captures primarily high energy photons being those which in the preferred application of the invention may be x-ray photons which have first passed through a target material or object at the energy range where the dominant attenuation mode is attributable to Compton Scattering. Thus, the ability of the scintillator to provide information regarding the density of the target material or object by collecting higher energy photons at high detection efficiency and allowing the drawing of inferences about the Compton Scattering contribution in the attenuation of photons by the target can be exploited simultaneously with the ability of the semiconductor detector to provide information regarding the effective atomic number of the target material or object by differentiating by energy in respect of the lower energy photons and allowing the drawing of inferences about the photoelectric absorption contribution in the attenuation of photons by the target. Thus the density of the material under investigation can be probed even with a simple energy integrating detector.

In the arrangement of FIG. 4, a proportion of the lower energy photons incident upon the hybrid detector is absorbed and detected within the semiconductor layer, and as a result does not impinge the scintillator layer, so that the spectrum of incident radiation incident upon the scintillator detector element already has a proportionally higher energy corresponding more closely to the energy range that the scintillator detector element is intended to target. In the illustrated embodiment, an optional absorber layer (22) is additionally provided, for example comprising a 1 mm copper layer, to reduce further the number of lower energy photons that impinge on the scintillator crystal, making the spectrum hitting the scintillator detector proportionally higher energy.

FIG. 5 illustrates an alternative embodiment of hybrid detector operating on the same general principles.

Incident radiation (31), for example having previously been transmitted through a target material or object, is again incident upon a first, semiconductor element (33) and a second, scintillator detector element (32). In this case, the two detector elements (32, 33) are disposed side by side so as to be irradiated simultaneously by the incident radiation (31).

Again, the first detector element comprises a semi-conductor detector layer (41). Again, the second detector element comprises a scintillator layer (43) and a photodetector layer (44), with an absorbing filter layer (42) disposed above them to absorb lower energy photons and ensure that the radiation incident upon the scintillator layer (43) is generally of the desired higher energy spectrum.

The illustrated embodiments in FIGS. 4 and 5 are shown schematically with the principal layers present only, and the skilled person will readily understand that the invention admits further layers, for example having other functional and structural roles, to contribute to the efficiency and efficacy of the hybrid detector.

Figure 6:
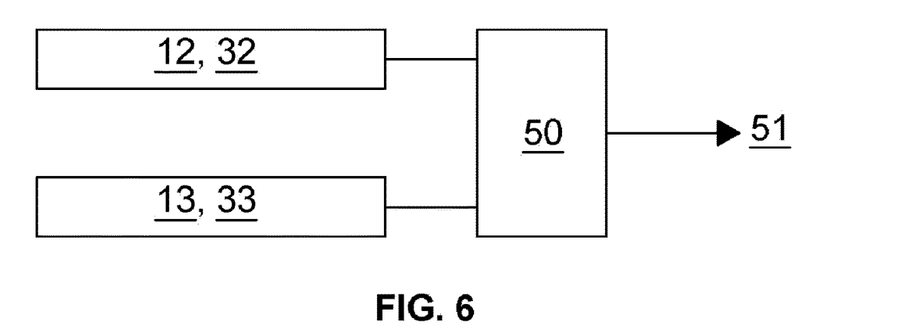
FIG. 6 illustrates the co-processing of radiation information collected at each of the two detector elements in a suitable processing module.

In particular, as illustrated in FIG. 6, an arrangement will be required to allow data collected as photons are incident upon and effect an interaction within the respective first and second detector elements (12, 32); (13, 33). In the illustrated simple schematic of FIG. 6, data relating to each interaction, comprising at least counts and fro example counts differentiated by energy, is passed to a data collection module (50). The date collection module (50) may include processing capacity for analysis, and/or may pass the collected data for analysis via the data link (51).

In particular preferably, energy-differentiated count data is processed to derive information about radiation incident upon the two detector elements that has been simultaneously integrated. In the preferred application, where the detector is used to determine attenuation of radiation as it passes through a target material or object, this includes deriving information regarding the attenuation of radiation, and in particular simultaneously deriving information attributable to attenuation of radiation passing through the target material or object due to the photoelectric effect and to Compton Scattering, and in particular by simultaneously processing information from the two detector elements, to derive information concerning both the effective atomic number and the density of the target material or object.

Thus, the invention is a hybrid scintillator and semiconductor detector. The first component of the hybrid detector is a thin semiconductor detector, with the second component a scintillator detector, with an optional absorber on an incident side of the scintillator detector and for example in between the two detectors. The semiconductor detector thickness is chosen to capture a sufficient amount of low energy photons, whilst absorbing few high energy photons. This will be semiconductor material and X-ray spectrum dependent, but for CZT will be less than 1 mm. The scintillator material and thickness will be chosen to have a high detection efficiency for higher energy photons. An optional absorber on an incident side of the scintillator detector and for example between the two detectors can remove many of the low energy photons before they impinge the scintillator crystal, making the spectrum hitting the scintillator detector proportionally higher energy.

Figure 7:
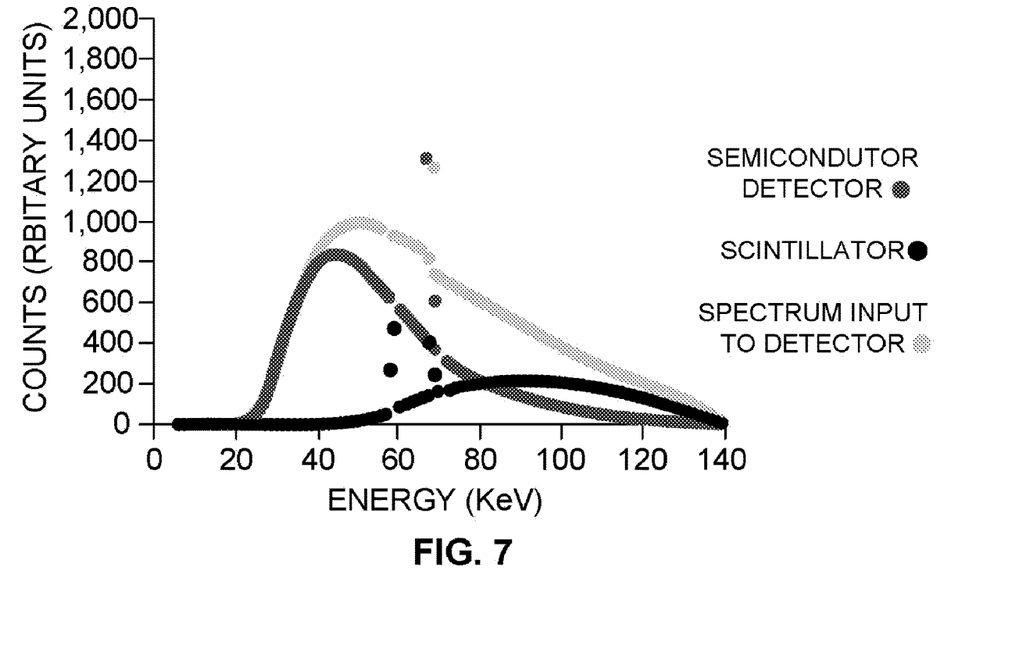
FIG. 7 shows an example simulation of signal absorbed within a hybrid detector such as embodied in FIGS. 4 to 6.

FIG. 7 shows the example simulation as outlined earlier, showing the signal absorbed by a 0.25 mm thick CZT detector, followed by the signal absorbed on a 10 mm NaI scintillator detector, with a 1 mm copper absorber in between the two detectors (that is, the embodiment of FIG. 5). It can be observed that the CZT detector collects most of the lower energy photons, thus capturing the Photoelectric contribution, with a much smaller contribution from higher energy photons. The scintillator detector captures primarily high energy photons, thus the density of the material under investigation can be probed even with a simple energy integrating detector.

The invention claimed is:

1. A hybrid radiation detector comprising:
    a first, energy discriminating detector element selected to be more responsive to radiation in a first, lower energy range, wherein the first detector element comprises a semiconductor detector;
    a second detector element selected to be more responsive to radiation in a second, higher energy range, wherein the second detector element comprises a scintillator detector;
    an absorber layer between the first detector element and the second detector element, wherein the absorber layer reduces lower energy range radiation upon the second detector element;
    wherein the first detector element is disposed over the second detector element.

2. A detector in accordance with claim 1 comprising a first detector element configured and arranged to collect incident radiation emergent from a target of such energy that the photoelectric effect predominates as an attenuation mode in the target; and a second detector element configured and arranged to collect incident radiation of a generally higher energy.

3. A hybrid radiation detector comprising:
    a first detector element comprising a semiconductor detector;
    a second detector element comprising a scintillator detector;
    an absorber layer between the first detector element and the second detector element, wherein the absorber layer reduces lower energy range radiation upon the second detector element;
    wherein the first detector element is disposed over the second detector element.

4. A detector in accordance with claim 3 comprising a first detector element configured and arranged to collect incident radiation emergent from a target of such energy that the photoelectric effect predominates as an attenuation mode in the target; and a second detector element configured and arranged to collect incident radiation of a generally higher energy.

5. A detector in accordance with claim 3 wherein:
    the first detector element is a semiconductor detector suitable to be more responsive to radiation in a first, lower energy range;
    the second detector element is a scintillator detector suitable to be more responsive to radiation in a second, higher energy range.

6. A detector in accordance with claim 3 adapted in use to detect radiation that has been incident upon and emergent from a target material or object, wherein the detector is specified such that:
    the first detector element is adapted to be more responsive to radiation in a first, lower energy range where the predominant attenuation mode in the target material or object is expected to be photoelectric absorption, and
    the second detector element is adapted to be more responsive to radiation in a second, higher energy range where the predominant attenuation mode in the target material or object is expected to be Compton Scattering.

7. A detector in accordance with claim 3 wherein the first, semiconductor detector element is configured to capture a substantial proportion and for example at least a major proportion of radiation in a first, lower energy range, while absorbing fewer and for example only a minor proportion radiation in a second, higher energy range.

8. A detector in accordance with claim 3 wherein the first detector element is configured to be sensitive in a first, lower energy range by selection of an appropriate thickness of detector element, wherein the thickness is in the range 10 mm to 1 mm, and preferably 100-250 µm.

9. A detector in accordance with claim 3 wherein the first, detector element is a semiconductor detector comprising a material adapted to exhibit a spectroscopically variable response across a target energy range.

10. A detector in accordance with claim 3 wherein the first detector element is a semiconductor detector comprising a material selected from cadmium telluride, cadmium zinc telluride (CZT), cadmium manganese telluride (CMT), and alloys thereof, and for example, save for incidental impurities, consists essentially of crystalline $Cd_{1-(a+b)}Mn_aZn_bTe$ where a+b<1 and a and/or b may be zero.

11. A detector in accordance with claim 3 wherein the second detector element comprises a scintillator material optically coupled to a photodetector, and optionally including a filter element disposed on an incident side of the scintillator material.

12. A detector in accordance with claim 11 wherein:
    the scintillator material is an inorganic scintillator for example selected from doped alkali halides, such as NaI(Tl), CsI(Tl), CsI(Na), LiI(Eu); other slow inorganics such as BGO, $CdWO_4$, ZnS(Ag); $Ce^{3+}$ activated fast inorganics such as lanthanum chloride ($LaCl_3$(Ce)), lanthanum bromide ($LaBr_3$(Ce)), CLLB ($Cs_2LiLaBr_6$(Ce)), GSO ($Gd_2SiO_5$(Ce)), YAP, YAG, LSO, LuAP, and the like; and/or
    the photodetector is a solid state photomultiplier.

13. A detector in accordance with claim 3 further comprising a data processor adapted to integrate data received from each detector element corresponding to each of a plurality of detected radiation interactions therein, and optionally further adapted to process the received data and draw inferences about the source of radiation incident upon the two detector elements.

14. A detector in accordance with claim 13 wherein the data processor is adapted to perform any or all of the following:
    receive a plurality of responses to an interaction attributable to incident radiation occurring within each of the first and second detector elements;
    determine, for each response, at least a count of the interaction;
    collectively process the resultant plurality of counts of interaction so determined;
    draw inferences from the said plurality of counts of interaction about the source of radiation incident upon the detector elements, and in particular where applicable about the material composition of a material or object causing attenuation of radiation from a source as it passes through the material or object before being incident upon the detector elements.

15. A method of detecting radiation comprising:
  providing a hybrid detector, wherein the hybrid detector comprises a first detector element, a second detector element, and an absorber layer between the first detector element and the second detector element, wherein the absorber layer reduces lower energy range radiation upon the second detector element;
  causing radiation to be incident upon the hybrid detector;
  obtaining a plurality of responses from each detector element to a corresponding plurality of interactions occurring within each detector element from the radiation incident thereon;
  determining for each of the plurality of responses a count of the interaction;
  drawing inferences therefrom about the source radiation.

16. The method of claim 15 applied to the determination of a radiation interaction in a target material or object by the detection of emergent radiation from the target material or object from radiation incident upon the target material or object, the method comprising:
  providing a source of radiation;
  causing the radiation to impinge upon a target;
  positioning the detector to receive radiation consequently emergent from the target;
  obtaining a plurality of responses from each detector element to a corresponding plurality of interactions occurring within each detector element from the radiation incident thereon;
  determining for each of the plurality of responses a count of the interaction;
  drawing inferences therefrom about radiation emergent from the target.

17. The method of claim 16 applied to the determination of attenuation of radiation incident upon the target material or object as it is transmitted through the target material or object.

18. The method of claim 16, wherein the drawing inferences about radiation emergent from the target comprises drawing inferences about the material composition of the target.

19. The method of claim 16, wherein the drawing inferences about the material composition of the target comprises drawing inferences about the effective atomic number and density of the target.

* * * * *